United States Patent [19]

Dean

[11] 4,423,017

[45] Dec. 27, 1983

[54] PROCESS FOR REDUCING NO EMISSIONS

[75] Inventor: Anthony M. Dean, Westfield, N.J.

[73] Assignee: Exxon Research and Engineering Co., Florham Park, N.J.

[21] Appl. No.: 316,143

[22] Filed: Oct. 29, 1981

[51] Int. Cl.$^3$ .......................... C01B 21/00; B01J 8/00
[52] U.S. Cl. ................................... 423/235; 423/237; 423/239; 423/351
[58] Field of Search .............. 423/235, 237, 239, 351, 423/239 A, 235 D

[56] References Cited

U.S. PATENT DOCUMENTS

| | | | |
|---|---|---|---|
| 3,102,003 | 8/1963 | Hummer | 23/210 |
| 3,545,931 | 12/1970 | McKinley | 23/232 |
| 3,900,554 | 8/1975 | Lyon | 423/235 |
| 3,970,739 | 7/1976 | Shiraishi | 423/235 |
| 4,129,651 | 12/1978 | Koike et al. | 423/235 |

FOREIGN PATENT DOCUMENTS 2601077  7/1976  Fed. Rep. of Germany ...... 423/235
2008967  6/1979  United Kingdom ................ 423/235

OTHER PUBLICATIONS

Klimisch et al., "Cat. Chem of Nitrogen Oxides", Plenum Press, N.Y., 1975, p. 125.

*Primary Examiner*—Gregory A. Heller
*Attorney, Agent, or Firm*—Henry E. Naylor

[57] ABSTRACT

Disclosed is an improved non-catalytic combustion process for reducing NO emissions to the atmosphere wherein a reducing gas comprising ammonia, either alone or in combination with one or more other reducing gases, is injected into a flowing combustion effluent containing NO and oxygen when at least a portion of the combustion effluent is in a reduction zone at a temperature within the range of about 700° C. to about 1100° C., the improvement which comprises placing a metallic material substantially at the end of the reduction zone to substantially reduce ammonia breakthrough.

6 Claims, No Drawings

PROCESS FOR REDUCING NO EMISSIONS

BACKGROUND OF THE INVENTION

This invention relates to an improved noncatalytic process for reducing the concentration of nitric oxide (NO) from combustion effluents by injecting ammonia into a combustion effluent at elevated temperatures. In particular, this invention relates to a process for minimizing ammonia breakthrough in such a process while keeping the formation of additional NO at a minimum.

Various oxides of nitrogen, particularly nitrogen dioxide, are known to cause deleterious effects in human, plant, and other animal life. Moreover, certain of these oxides have been identified as reactants in photochemical smog formation. Consequently, the emission of these nitrogen oxides to the atmosphere poses a threat to the health and welfare of the community. As a result, considerable effort is being made to minimize the emission of these oxides to the atmosphere. A major source of these nitrogen oxides is NO contained in combustion effluents emanating from such stationary sources as gas and oil-fired steam boilers for electric power plants, process furnaces, municipal incinerators, and coal-fired utility boilers.

Considerable efforts have been made in the art to develop methods for removing NO from combustion effluents. U.S. Pat. No. 3,900,554, which is incorporated herein by reference, describes a variety of processes, both catalytic and non-catalytic, for reducing the concentration of NO in combustion effluents. It is recognized in the art that the non-catalytic processes, such as the process claimed in U.S. Pat. No. 3,900,554, are more desirable from an economic point of view provided the desired degree of NO reduction can be achieved at all furnace or boiler loadings. Catalytic processes require the use of an expensive catalyst which may be poisoned by various impurities, such as sulfur oxide, steam, soot, and the like, in the combustion effluent.

Although several of these prior art processes have been proven successful in varying degrees for reducing NO in combustion effluents, there still remains a problem of ammonia breakthrough especially when excess ammonia is employed to further reduce NO emission. That is, some of the ammonia may remain unreacted and be emitted in the combustion effluent as a pollutant, thereby partially defeating its purpose as an agent for removing NO.

SUMMARY OF THE INVENTION

In accordance with the present invention, there is provided an improvement to a non-catalytic process wherein a reducing gas comprising ammonia, either alone or in combination with one or more additional reducing gases, is injected into a flowing combustion effluent containing NO and oxygen, when at least a portion of said combustion effluent is in a reduction zone at a temperature within the range of about 700° C. to about 1100° C. to reduce the NO concentration therein, the improvement which comprises reducing ammonia breakthrough by placing a metallic material substantially at the end of the reduction zone thereby substantially reducing ammonia breakthrough.

In preferred embodiments of the present invention, the reduction zone is at a temperature from about 850° C. to about 1000° C. and the metallic material is a heat resistant alloy selected from the group consisting of the iron-based alloys, nickel-based alloys, cobalt-based alloys and oxide dispersion strengthened alloys.

DETAILED DESCRIPTION OF THE INVENTION

As previously indicated, the present invention relates to an improved non-catalytic process for reducing NO emissions to the atmosphere from a stationary combustion source such as gas and oil-fired steamed boilers for electric power plants, process furnaces, municipal incinerators, and coal-fired utility boilers. Also, as previously indicated, U.S. Pat. No. 3,900,554, teaches the use of ammonia as the principal reducing agent, which is also the principal reducing agent in the present invention. The ammonia can be used as a pure substance or it can be stored prior to use in a form other than the pure substance and is employed as a precursor. Useful forms of ammonia include its solution in water, the compounds ammonium carbonate, ammonium formate, and ammonium oxalate, and their solutions in water. All the above substances yield ammonia on vaporization, while the formate and oxalate also yield formic acid and oxalic acid respectively. The vaporization may be accomplished as a separate step or by injection into the hot effluent as desired. If vaporization of ammonium formate or ammonium oxalate, or their solutions in water, is accomplished as a separate step, than one may, if desired, decompose the formic, the oxalate acid, or both, to form hydrogen by either thermal or catalytic means prior to injection into the hot effluent.

If ammonia is used alone, it is effective for reducing NO emissions within a temperature range from about 850° C. to about 1100° C.; it is more effective within a temperature range from about 925° C. to about 1050° C. This effective temperature range may be extended to a temperature range of about 700° C. to about 1100° C. by employing one or more additional reducing agents such as paraffinic, olefinic, and aromatic hydrocarbons, oxygenated hydrocarbons, nitrogenated hydrocarbons, sulfonated hydrocarbons, carbon monoxide, and hydrogen. Preferred is hydrogen because it is not an air pollutant itself and because it does not yield an air pollutant by incomplete oxidation.

As is well known, combustion is effected in stationary combustion equipment in a section of the equipment commonly referred to as a firebox. Generally, this is accomplished by igniting a suitable fuel in the presence of air. Materials other than conventional fuels can, however, be combusted in the firebox, which is generally the case for incinerators. In any event, the principal combustion products are carbon dioxide and steam, and these products, as well as other combustion products such as carbon monoxide and the various oxides of nitrogen and sulfur, combine with excess oxygen and unconverted nitrogen to form what is referred to herein as combustion effluent.

In the practice of the present invention, ammonia is contacted with the combustion effluent in the presence of oxygen. The combustion effluent usually contains a suitable amount of oxygen. When the oxygen content is too low, air may be used to dilute the combustion effluent to give an oxygen content greater than about 0.1 volume %, preferably about 1 to 15 volume %, based on the total volume of effluent.

The amount of ammonia required in a non-catalytic process suitable for the practice of the present invention is usually from about 0.4 to 50 times the NO concentration in the combustion effluent. The minimum amount of ammonia required is usually at least one mol of ammonia per mol of NO to be removed although the specific amount of ammonia employed can be selected from the viewpoint of economical operation and NO removal rate. In order to achieve a high conversion of NO, it is desirable to employ ammonia in an amount greater than one mol of ammonia per mol of NO to be removed. Such greater amounts of ammonia may cause ammonia to remain unreacted in the combustion effluent, even beyond the temperature zone where No is reduced. This unreacted ammonia is emitted to the atmosphere as a pollutant and is also referred to herein as ammonia breakthrough. It will be noted that ammonia breakthrough may also occur at lower concentrations of ammonia to NO depending on such process conditions employed as residence time and temperature. By residence time, as used herein, means the time during which ammonia and No are in contact with each other in the temperature range of about 700° C. to 1100° C. Because ammonia breakthrough must often be minimized, it places a constraint on commercial applications because both the range of concentration of ammonia to NO in the combustion effluent and the range of acceptable residence times must be decreased. As a result, certain government regulations concerning an acceptable level of NO reduction may not be achieved.

Although ammonia breakthrough has been recognized as a limiting factor in achieving high levels of NO reduction, the prior art has approached the problem in various ways—all of which have substantial limiting factors in and of themselves. For example U.S. Pat. No. 4,129,651 discloses that some of the ammonia employed for the reduction of NO is contacted with the surface of the heat exchanger used in the combustion apparatus and is consequently converted to nitrogen oxides under the catalytic activity of the metal surface or vanadium adhered on the metal surface and the amount of nitrogen oxides is increased on the contrary of the contribution for removing nitrogen oxides. U.S. Pat. No. 4,129,651 proposes to solve this problem by feeding the ammonia at a position where the heat exchanger surface area in the space, where the residence time of the waste gas is up to 1 second downstream of the ammonia source, is less than $0.5 \times 10^{-2}$ m$^2$ per 1 Nm$^3$/H of the combustion effluent flow. On the contrary, the present invention is able to minimize ammonia breakthrough with minimum additional NO production without the limiting requirement disclosed in the abovementioned patent. This is particularly evidenced by the examples which illustrate that the inventor hereto has unexpectedly found that at residence times much less than one second and with metallic surface areas greater than those taught in the above discussed patent, ammonia breakthrough is substantially reduced with minimum NO production.

Furthermore, U.S. Pat. No. 3,970,739 discloses a catalytic process for reducing NO emissions from combustion effluents by use of ammonia in the presence of a catalyst. In that patent, it is further disclosed that at temperatures greater than about 700° C. the formation of nitrogen oxides by the reaction of ammonia with oxygen will increase to a great extent. By the practice of the present invention ammonia breakthrough can be minimized, that is excess ammonia can be decomposed, at temperatures greater than 700° C. and with a minimum amount of additional NO produced.

Metallic materials suitable for use in the present invention include any metallic material capable of withstanding the high temperature environments encountered when employing the present invention. Non-limiting examples of such metallic materials include: heat and corrosion resistant alloys such as iron-based alloys nickel-based alloys, cobalt-based alloys, as well as those alloys produced by powder metallurgy, such as oxide dispersion stregthened alloys. Of course the metallic materials in the practice of the present invention may contain various metal coatings such as eutectic, vaporized, and painted coatings.

As previously stated, the metallic material is placed substantially at the end of the reduction zone. The reduction zone will be in the temperature range of about 700° C. and 1100° C. and will start at the point of ammonia injection to the point where the NO reduction reaction is complete. It is important in the practice of the present invention that the metallic material not be placed too close to the ammonia injection point. Of course, the precise location of the metallic material will be dependant upon such factors as temperature, effluent flow rate, concentration of ammonia in the effluent, and location of the ammonia injection grid. By use of the instant disclosure and examples, one having ordinary skill in the art will be able to determine by routine experiment where the metallic material should be placed.

A further understanding of the invention can be obtained by reference to the following examples which are for purposes of illustration only and are not intended to be limiting unless otherwise specified.

All of the following examples were conducted in a 15 cm long quartz reaction tube having an inside diameter of 1 cm. The reaction tube contains input and output legs constructed of 0.2 cm quartz tubing and was heated in a 30 cm furnace. The temperature was monitored with a thermocouple attached to the outside center of the reaction tube. All analyses were done with a chemiluminesent analyzer which was located downstream of the reactor.

COMPARATIVE EXAMPLES A TO D

Data were collected by use of the previously described reaction vessel at four different residence times at various temperatures by using a gaseous mixture consisting of 170 ppm NO, 258 ppm NH$_3$, 4.1% O$_2$ in a helium diluent. The pressure was 1.2 atmospheres. The gas exiting the reactor was analyzed and compared with the initial gaseous mixture. The conditions and results are set forth in Table I below.

TABLE I

| Comp. Ex. | Temp. °C. | Residence Time (Sec)[1] | NO/NO$_{initial}$ | NH$_3$/NH$_3$ $_{initial}$ |
|---|---|---|---|---|
| A | 841 | 0.29 | 0.90 | 0.93 |
| B | 841 | 0.44 | 0.66 | 0.80 |
| C | 929 | 0.19 | 0.20 | 0.18 |
| D | 930 | 0.28 | 0.20 | 0.11 |

[1]time NH$_3$ is in the 15 cm reaction tube

EXAMPLES 1-4

Four experiments were performed according to the procedure set forth in the above Comparative Examples except a piece of 310 stainless steel having a surface area of 7.1 cm$^2$ was placed at the end of the reaction tube. Table II below contains the conditions and results of these four experiments.

TABLE II

| Ex. | Temp. °C. | Residence Time (Sec) | NO/NO$_{initial}$ | NH$_3$/NH$_3$ $_{initial}$ |
| --- | --- | --- | --- | --- |
| 1 | 841 | 0.29 | 1.02 | 0.58 |
| 2 | 841 | 0.44 | 1.02 | 0.46 |
| 3 | 929 | 0.19 | 0.35 | 0.06 |
| 4 | 930 | 0.28 | 0.29 | 0.02 |

These experiments illustrate the effectiveness of a metal substance, such as stainless steel, for minimizing ammonia breakthrough without significantly increasing NO formation when the metal substance is located substantially at the end of the reaction zone. That is, in example 4 the metallic material was more nearly at the end of the reaction zone than in example 3.

EXAMPLES 5-8

Four additional experiments were conducted under identical conditions as the previous four examples to establish whether or not a metal substance, other than one conventionally employed for ammonia decomposition, could also be used to minimize ammonia breakthrough under the reaction conditions employed herein. A piece of aluminized stainless steel also having a surface area of 7.1 cm$^2$, was placed at the end of the reaction tube. Table III below sets forth the conditions and results of these experiments.

TABLE III

| Ex. | Temp. °C. | Residence Time (Sec) | NO/NO$_{initial}$ | NH$_3$/NH$_3$ $_{initial}$ |
| --- | --- | --- | --- | --- |
| 5 | 841 | 0.29 | 0.91 | 0.57 |
| 6 | 841 | 0.44 | 0.87 | 0.47 |
| 7 | 929 | 0.19 | 0.28 | 0.055 |
| 8 | 930 | 0.28 | 0.23 | 0.008 |

The data of the above table evidence that a metal substance having a metallic surface comprised of a metal other than a metal conventionally used for the decomposition of ammonia can be employed in the practice of the instant invention.

COMPARATIVE EXAMPLES E-H and EXAMPLES 9-12

Experiments were run according to the above procedure except the gaseous mixture was comprised of 170 ppm NO and 544 ppm NH$_3$. Table IV below sets forth the reaction conditions and results of these experiments.

TABLE IV

| Ex. | Temp. °C. | Residence Time (Sec) | NO/NO$_{initial}$ | NH$_3$/NH$_3$ $_{initial}$ |
| --- | --- | --- | --- | --- |
| Comp. E | 839 | 0.30 | 0.68 | 0.75 |
| Comp. F | 839 | 0.44 | 0.41 | 0.72 |
| Comp. G | 928 | 0.18 | 0.08 | 0.32 |
| Comp. H | 930 | 0.29 | 0.03 | 0.32 |
| 9 | 839 | 0.30 | 0.80 | 0.54 |
| 10 | 839 | 0.44 | 0.64 | 0.45 |
| 11 | 928 | 0.18 | 0.17 | 0.18 |
| 12 | 930 | 0.29 | 0.16 | 0.12 |

The data in the above table illustrates the effectiveness of the present invention at a substantially high ratio of NH$_3$ to NO.

What is claimed is:

1. In a non-catalytic combustion process wherein a reducing gas comprising ammonia, either alone or in combination with one or more additional reducing gases, is injected into a flowing combustion effluent containing NO and oxygen when at least a portion of said combustion effluent is in a reduction zone at a temperature within the range of about 850° C. to about 1100° C. to reduce the NO concentration therein, the improvement which comprises placing a metallic material selected from the group consisting of heat resistant iron-based alloys, nickel-based alloys, cobalt-based alloys, and oxide dispersion strengthened alloys substantially at the end of the reduction zone, said metallic material having a surface area greater than about $0.5 \times 10^{-2}$ m$^2$ per Nm$^3$/H of the combustion gas effluent flow within a gas residence time zone of less than one second from the ammonia source, thereby substantially reducing ammonia breakthrough without substantially producing additional amounts of NO.

2. The process of claim 1 wherein the metallic material is stainless steel.

3. The process of claim 1 wherein hydrogen is employed as an additional reducing gas.

4. The process of claim 1 wherein the metallic material is placed within a residence time of about 0.4 seconds from the ammonia source.

5. The process of claim 3 wherein the metallic material is placed within a residence time about 0.4 seconds from the ammonia source.

6. The process of claim 1 wherein the surface of the metallic material in contact with the combustion effluent is aluminized.

* * * * *